Figure 1:
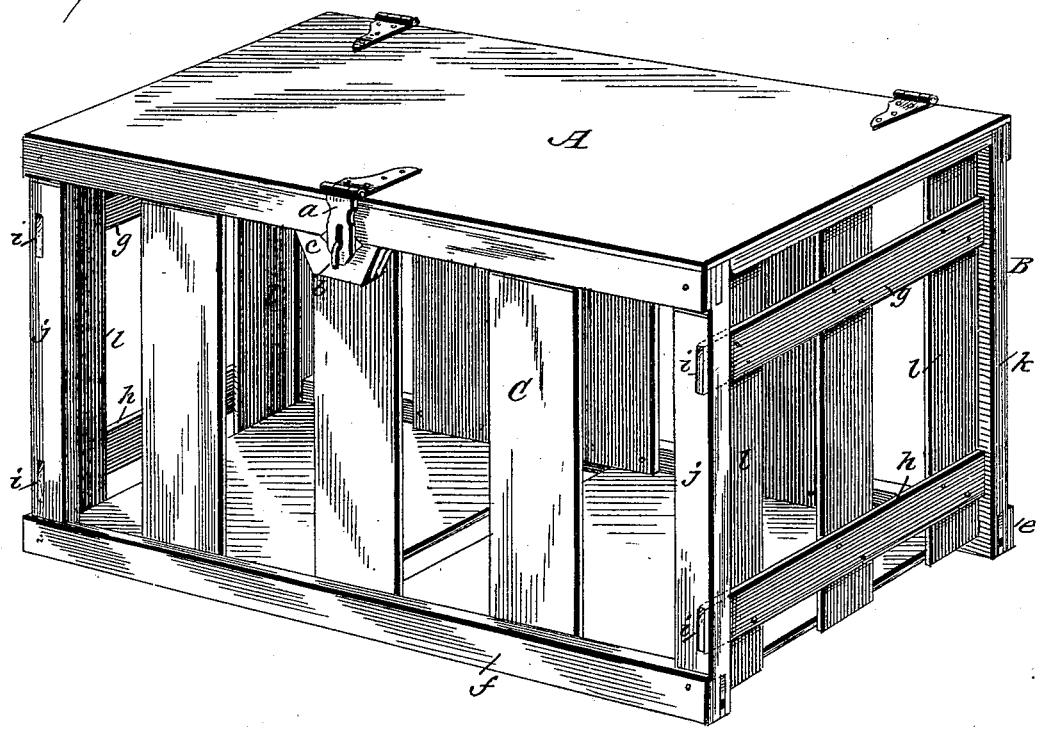

No. 706,022. Patented Aug. 5, 1902.
H. E. CLEMENT.
KNOCKDOWN CRATE.
(Application filed Feb. 24, 1902.)

(No Model.) 2 Sheets—Sheet 1.

Witnesses
C. J. Williamson
M. E. Moore

Inventor
Henry E. Clement
per Chas. N. Fowler
Attorney

THE NORRIS PETERS CO., PHOTO-LITHO., WASHINGTON, D. C.

No. 706,022. Patented Aug. 5, 1902.
H. E. CLEMENT.
KNOCKDOWN CRATE.
(Application filed Feb. 24, 1902.)
(No Model.) 2 Sheets—Sheet 2.
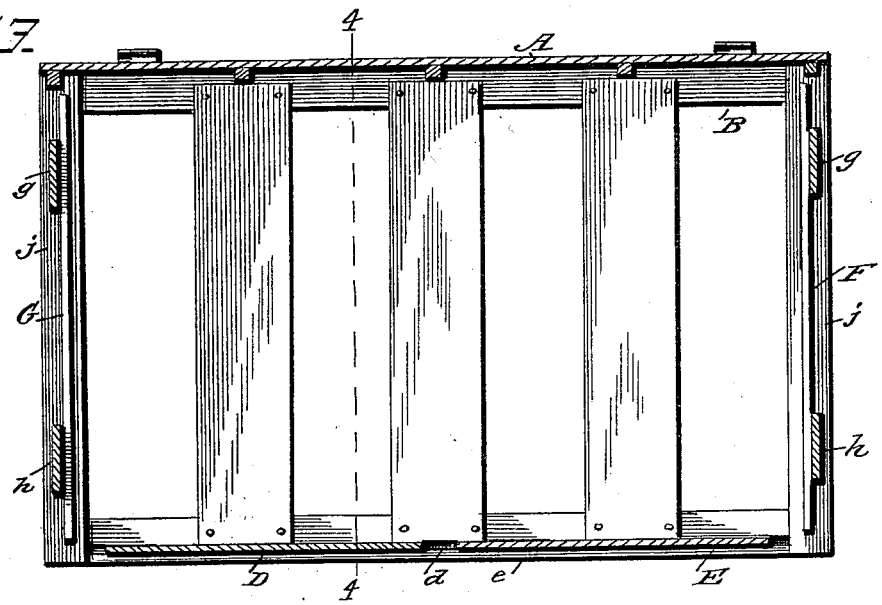
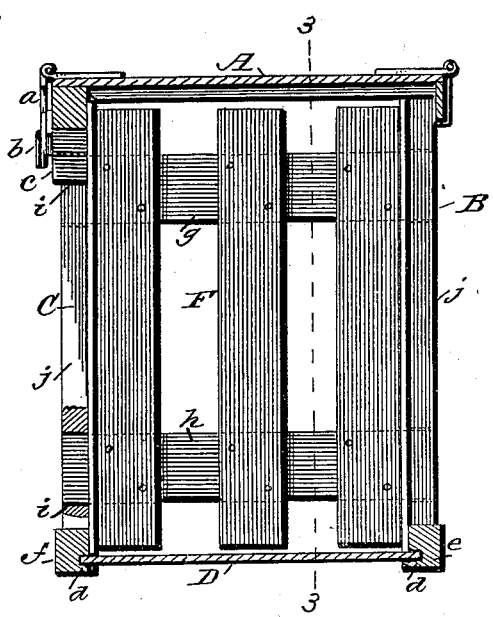
Witnesses
C. J. Williamson
M. E. Moore
Inventor
Henry E. Clement
per Chas. H. Fowler
Attorney

UNITED STATES PATENT OFFICE.

HENRY E. CLEMENT, OF THOMASVILLE, NORTH CAROLINA.

KNOCKDOWN CRATE.

SPECIFICATION forming part of Letters Patent No. 706,022, dated August 5, 1902.

Application filed February 24, 1902. Serial No. 95,251. (No model.)

*To all whom it may concern:*

Be it known that I, HENRY E. CLEMENT, a citizen of the United States, residing at Thomasville, in the county of Davidson and State of North Carolina, have invented certain new and useful Improvements in Knockdown Crates; and I do hereby declare that the following is a full, clear, and exact description of the same, reference being had to the annexed drawings, making a part of this specification, and to the letters of reference marked thereon.

The object of the present invention is to provide a knockdown crate for the transportation of berries and other fruit or for any purpose to which a crate of this character may be found useful, that will be simple in construction and both strong and durable, and one that can be manufactured at a comparatively reduced cost; and the invention consists in a knockdown crate constructed substantially as shown in the drawings and hereinafter described and claimed.

Figure 2:
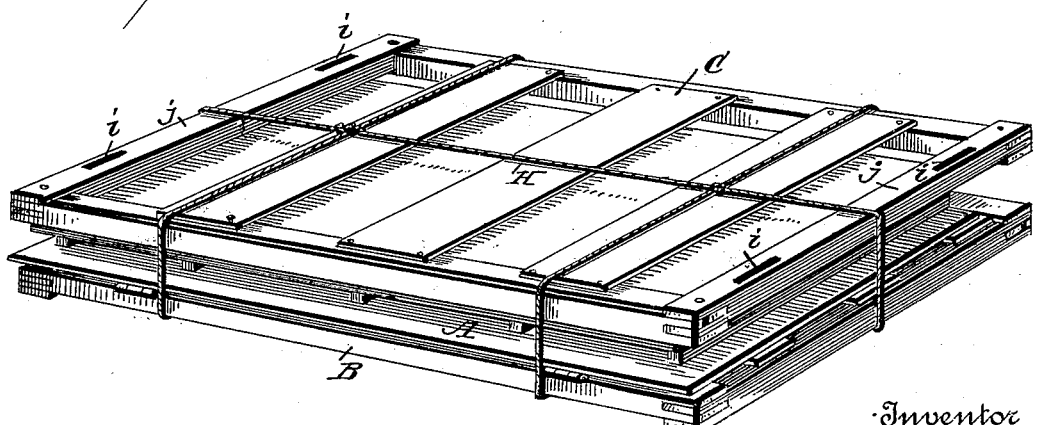

Figure 1 of the drawings represents a perspective view of a knockdown crate constructed in accordance with my invention; Fig. 2, a similar view showing the crate in a knockdown form ready for transportation; Fig. 3, a longitudinal vertical section taken on line 3 3 of Fig. 4; Fig. 4, a transverse section taken on line 4 4 of Fig. 3.

The crate consists in part of a hinged top A, the same being hinged to the side section B, while the side section C, which is opposite to that of the side section B, is independent thereof. The hinged top section A is provided with a suitable hinged hasp $a$, which engages a pivoted fastening-rod $b$, secured to a block $c$ on the side section C, whereby the crate when set up and containing the berries or other fruit will enable the hinged top section A to be fastened.

Any suitable fastening device may be substituted for that shown, so long as the hinged top section is held in place when the crate is filled and ready for transportation.

The side sections B C have longitudinal grooves $d$ upon the inner side of the horizontal braces $ef$, as shown more clearly in Fig. 4 of the drawings, and these grooves receive the edges of the bottom sections D E, which form the bottom of the crate.

The ends of the crate are shown at F G, which have transverse bars $g\ h$, the ends of which project and engage sockets $i$ in the upright standards $j\ k$ of the side sections B C, respectively.

After the bottom sections D E and the end sections F G are connected to side section B the side section C is connected to the bottom sections and the end sections, the crate when thus set up being shown in Fig. 1 of the drawings, and, if desired, a few nails may be used to secure the parts together.

In taking the crate down the several sections are separated and packed, and to retain the sections together while being transported a suitable cord or rope H may be used, as shown in Fig. 2 of the drawings.

The upright slats $l$, forming a part of the end sections F G, abut against the inner sides of the side sections B C, by which the ends and sides of the crate are braced and rendered perfectly rigid and secure.

As will be noticed, the two sections A B are hinged together, while the section C and the bottom sections D E, as well as the end sections F G, are separate and independent of each other, and the manner of connecting them together provides a knockdown crate both simple in construction and possessing strength and durability and the parts readily connected together or separated.

Having now fully described my invention, what I claim as new, and desire to secure by Letters Patent, is—

A knockdown crate, comprising two side sections, a top hinged to one of said sections, both sections having longitudinal grooves upon the inner sides of the bottom braces thereof, bottom sections fitting in said grooves, and the upright standards at each end of the side sections having sockets, and end sections with horizontal bars, the projecting ends of which engage the sockets, and the inner upright bars of said end sections abutting against the end upright standards of the side sections to brace the crate at its corners without additional fastenings, substantially as and for the purpose set forth.

In testimony that I claim the above I have hereunto subscribed my name in the presence of two witnesses.

HENRY E. CLEMENT.

Witnesses:
J. F. PLUMMER,
JESSE CARTER, Jr.